US 6,747,666 B2

(12) United States Patent
Utterback et al.

(10) Patent No.: US 6,747,666 B2
(45) Date of Patent: Jun. 8, 2004

(54) METHOD AND SYSTEM FOR FACILITATING WIRELESS, FULL-BODY, REAL-TIME USER INTERACTION WITH DIGITALLY GENERATED TEXT DATA

(75) Inventors: Camille Utterback, Brooklyn, NY (US); Romy Achituv, Brooklyn, NY (US)

(73) Assignee: New York University, New York, NY (US)

( * ) Notice: Subject to any disclaimer, the term of this patent is extended or adjusted under 35 U.S.C. 154(b) by 420 days.

(21) Appl. No.: 09/771,011

(22) Filed: Jan. 26, 2001

(65) Prior Publication Data

US 2001/0035865 A1 Nov. 1, 2001

Related U.S. Application Data

(60) Provisional application No. 60/178,228, filed on Jan. 26, 2000.

(51) Int. Cl.$^7$ ................................. G09G 5/00
(52) U.S. Cl. ......................................... 345/629
(58) Field of Search ............................. 345/629, 589; 348/42, 559, 629, 700, 47; 382/103

(56) References Cited

U.S. PATENT DOCUMENTS

| 4,521,773 A | 6/1985 | Lyon ........................ 340/710 |
|---|---|---|
| 4,599,611 A | 7/1986 | Bowker et al. ............. 340/721 |
| 4,843,568 A | 6/1989 | Krueger et al. ............ 358/107 |
| 5,051,904 A | 9/1991 | Griffith ................. 364/413.16 |
| 5,129,013 A | 7/1992 | Holzmann et al. ............ 382/44 |
| 5,341,155 A | 8/1994 | Elrod et al. ................. 345/179 |
| 5,473,364 A | * 12/1995 | Burt ............................ 348/47 |
| 5,490,240 A | 2/1996 | Foran et al. ................ 395/130 |
| 5,534,917 A | 7/1996 | MacDougall ............... 348/169 |
| 5,544,317 A | 8/1996 | Berg .................... 395/200.04 |
| 5,552,824 A | 9/1996 | DeAngelis et al. ......... 348/157 |
| 5,563,988 A | 10/1996 | Maes et al. ................ 395/121 |
| 5,666,175 A | 9/1997 | Spitzer et al. ............... 349/95 |
| 5,721,585 A | 2/1998 | Keast et al. ................. 348/36 |
| 5,886,707 A | 3/1999 | Berg ........................... 345/433 |
| 6,005,493 A | 12/1999 | Taniguchi et al. .......... 340/990 |
| 6,008,865 A | * 12/1999 | Fogel ......................... 348/700 |
| 6,040,873 A | 3/2000 | Izumi et al. ................ 348/559 |
| 6,067,367 A | 5/2000 | Nakajima et al. ........... 382/103 |
| 6,069,637 A | 5/2000 | Gaglione et al. ........... 345/435 |
| 6,094,215 A | 7/2000 | Sundahl et al. .............. 348/42 |
| 6,203,425 B1 | 3/2001 | Hayashi ........................ 463/1 |
| 6,400,463 B2 | * 6/2002 | Kitamura et al. .......... 358/1.15 |
| 6,471,649 B1 | * 10/2002 | Saccardo et al. ........... 600/437 |

OTHER PUBLICATIONS

Vincent, "Mandala: Virtual Village" and Stanfel, "Mandala" Virtual Cities, Proceedings of ACM Siggraph 1993 at 207–208 (1993).
M. Krueger, Artificial Reality II (Addison–Wesley Publishing Co., 1991).
"Mandala VR News," Fall /Winter 1993.

* cited by examiner

Primary Examiner—Mark Zimmerman
Assistant Examiner—Hue Dung X. Cao
(74) Attorney, Agent, or Firm—Darby & Darby

(57) ABSTRACT

An interactive display system includes an electronic camera which intermittently records a participant's image and digitally inputs the video image into a computer, creating a digitized "virtual user image". The camera is positioned behind a large viewing screen which faces the user and records the user's image through an opening provided within the screen. The computer further receives a text string having a fall rate value. For each digital image received by the camera, a software program determines the destination of each line of text according to its fall rate, and then uses pixel color comparison techniques to determine if a "virtual obstacle" is located at the particular destination. If not, the text is displayed at the destination so that the text appears to "fall" on the screen. If a virtual obstacle is present, a new higher destination is determined until the virtual obstacle is no longer detected. This arrangement causes the falling text displayed on the screen to be selectively "caught" by the user and otherwise manipulated in the virtual environment.

10 Claims, 7 Drawing Sheets

FIG. 5

| | | | | | | | | | | | | | | | | | | | | | |
|---|---|---|---|---|---|---|---|---|---|---|---|---|---|---|---|---|---|---|---|---|---|
| Text String | W | h | e | n | | i | t | | r | a | i | n | s | , | | i | t | | p | o | u | r | s | . |
| Fall Rate | | | | | | | | | | | | | | | | | | | | | | |
| Fall Delay | | | | | | | | | | | | | | | | | | | | | | |
| Color Code | | | | | | | | | | | | | | | | | | | | | | |
| Horizontal Hold | | | | | | | | | | | | | | | | | | | | | | |
| Fade | | | | | | | | | | | | | | | | | | | | | | |
| Edge Detect | | | | | | | | | | | | | | | | | | | | | | |
| Maximum Fall Distance | | | | | | | | | | | | | | | | | | | | | | |

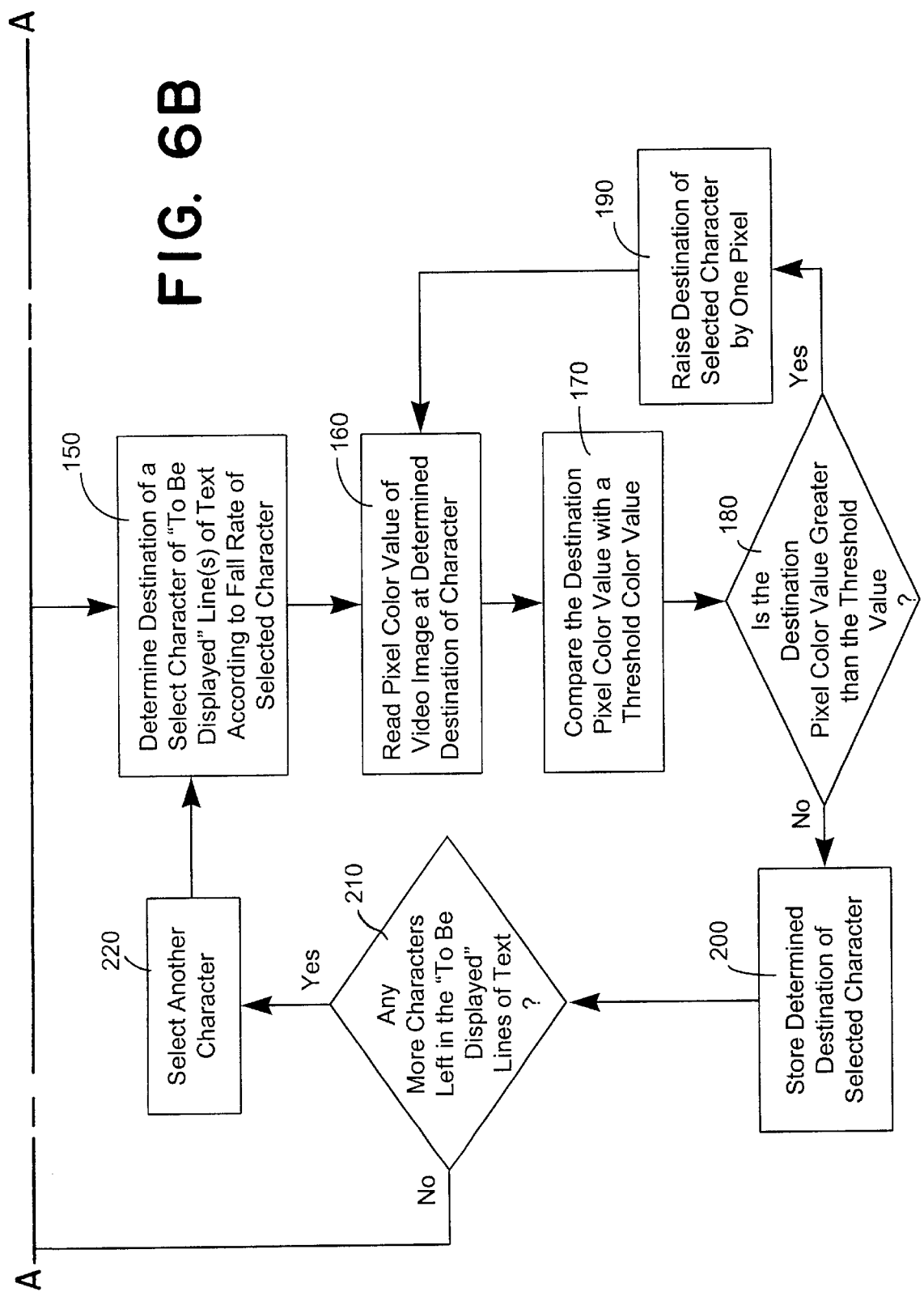

METHOD AND SYSTEM FOR FACILITATING WIRELESS, FULL-BODY, REAL-TIME USER INTERACTION WITH DIGITALLY GENERATED TEXT DATA

This patent application claims priority under 35 U.S.C. §119 of provisional patent application, Ser. No.: 60/178,228, filed Jan. 26, 2000, which is hereby incorporated by reference as if set forth in its entirety herein (including the source code).

COMPUTER PROGRAM LISTING APPENDIX

This application incorporates by reference in its entirety a computer program listing appendix containing the source code-listings which were described in the patent application at the time of filing and which have now been reproduced on compact disk. The compact disk contains the file entitled "APPENDIX (SOURCE CODE)," was created on Jun. 18, 2003, and encompasses 812 kilobytes.

BACKGROUND OF THE INVENTION

1. Field of the Invention

The present invention relates to interactive computer systems, and in particular to a method and apparatus for facilitating wireless, full-body interaction between a human participant and a computer-generated graphical environment including textual data.

2. Description of Related Art

So-called "virtual reality" ("VR") systems enable users to experience computer-generated environments instead of merely interacting with them over a display screen. Such systems typically require the user to don goggles, through which he or she perceives the virtual environment, as well as sensors that encode the user's gestures as electrical signals. The user reacts naturally to the changing virtual environment, generating signals that the computer interprets to determine the state and progress of the presented environment.

In order to encode a sufficiently broad spectrum of gestures to facilitate natural interaction, VR systems ordinarily require the user to wear, in addition to the goggles, at least one "data glove" to detect hand and finger movements, and possibly a helmet to detect head movements. Full-body systems, which encode movements from numerous anatomical sites to develop a complete computational representation of the user's overall body action, require many more sensors; however, such systems, would be capable of projecting the user fully into the virtual environment, providing the user with greater control and a heightened sense of participation ideally suited to interactive simulations.

Unfortunately, numerous practical difficulties limit the capacity of current VR systems to achieve this goal. The nature of the interaction currently offered, even with full-body sensor arrays, is limited. The computational demands placed on a system receiving signals from many sensors can easily overwhelm even large computers, resulting in erratic "jumps" in the visual presentation that reflect processing delays. Moreover, no matter how many sensors surround the user, they cannot "see" the user, and therefore cannot integrate the user's true visual image into the virtual environment.

Economic and convenience factors also limit sensor-type VR systems. As the capabilities of VR systems increase, so do the cost, awkwardness and inconvenience of the sensor array. The sensors add weight and heft, impeding the very motions they are intended to detect. They must also ordinarily be connected, by means of wires, directly to the computer, further limiting the user's movement and complicating equipment arrangements.

In order to overcome the limitations associated with sensor-based VR systems, researchers have devised techniques to introduce the user's recorded image into a virtual environment. The resulting composite image is projected in a manner so that it may be viewed by the user, enabling the user to observe his or her appearance in and interaction with the virtual environment.

Three such approaches include the VideoPlace system (see, e.g., M. Krueger, Artificial Reality II (1991) and U.S. Pat. No. 4,843,568), the Mandala system (see, e.g., Mandala VR News, Fall/Winter 1993; Vincent, "Mandala: Virtual Village" and Stanfel, "Mandala: Virtual Cities," Proceedings of ACM SIGGRAPH 1993 at 207–208 (1993)), and MIT's system disclosed in U.S. Pat. No. 5,563,988. Unfortunately, these systems exhibit various limitations. For example, Krueger's VideoPlace requires a special background and ultraviolet lamps, and extracts and represents only the user's silhouette. The Mandala system can integrate the user's full image within the virtual environment it creates, but requires a chroma-key blue background. The system developed by MIT provides a 3-Dimensional spatial video interaction with a user and is directed to detecting and analyzing gestural information of the user to cause predetermined responses from graphically generated objects within the virtual environment (e.g., if a virtual user pets a graphically generated dog within the virtual environment, the dog may wag its tail). Regardless of the systems, all of the above-described VR systems employ complex video analysis and tracking techniques to detect and follow the boundaries of the user's image within the virtual environment.

The disclosure of U.S. Pat. Nos. 5,563,988 of Maes et al, and 4,843,568 of Krueger et al. are hereby incorporated by reference as if set forth in their entirety herein.

Applicant has recognized the need for a simple 2-dimensional video-generated real-time interaction system wherein text data is easily introduced into a virtual environment, as viewed on a monitor or on a projection screen. The inputted text data is manipulated in the virtual environment by video representation of a human participant (a "virtual user"). Through movements in the real world, the human participant or virtual user freely interacts with the inputted text data in the virtual environment as the human participant (and other people watching the monitor or projection screen) absorbs the teachings of the text data as he or she interacts with the text data in the virtual environment.

OBJECTS OF THE INVENTION

It is an object of the present invention to provide a wireless VR system that easily accepts text data from a text input to be displayed onto a monitor (or projection screen) so that the font, size, shape, and/or movements of words and/or characters (e.g, letters, symbols and numbers) of the inputted text data may be altered by a virtual user (a real-time video representation of a human participant).

It is another object of the invention to enable the virtual user to interact with computer-generated, visually represented text data in such a manner that allows the inputted text to be readable within the virtual environment so that the virtual user may learn, understand, or otherwise experience the meaning of the textual data as he or she interacts with the text within the virtual environment.

It is another object of the invention to provide an interaction display system wherein text data and the video image of a user is combined within a virtual environment to promote marketing, advertisement, sales, and entertainment.

It is another object of the invention to provide an interaction display system wherein text data and the video image of a user is combined within a virtual environment and wherein the text data viewed within the virtual environment may be changed in realtime in response to actions by the user or by others.

It is another object of the invention to provide an interaction display system wherein text data and the video image of a user is combined within a virtual environment and wherein the text data is imported from a local text file.

It is another object of the invention to provide an interaction display system wherein text data and the video image of a user is combined within a virtual environment and wherein the text data is imported from a remote site over the Internet.

It is another object of the invention to provide an interaction display system wherein text data and the video image of a user is combined within a virtual environment and wherein the text data is inputted directed from a keyboard.

The foregoing and other objects of this invention can be appreciated from the Summary of the Invention, the drawing Figures and Detailed Description.

SUMMARY OF THE INVENTION

In accordance with the invention, a controlling software program instructs an interactive display system. The interactive display system includes an electronic camera (e.g., charge-coupled device or "CCD") which intermittently records (in realtime) a human participant's (a user) image and inputs the video image into a computer. The computer creates a digitized version of the inputted image (e.g., a bitmap of pixels) and thereby creates a "virtual user image". According to one embodiment, the camera is positioned behind a large viewing screen which faces the user and records the user's image through an opening provided within the screen. The computer further receives a data record including text data and text controlling parameters, preferably including at least a fall rate value. The data record may be supplied to the computer using any of several conventional memory mediums, such as a hard drive memory, disc memory, compact disc, or the data record may only include a text string which is supplied to the computer directly from the Internet through a connected modem, for example, or through the use of a connected keyboard. Alternately, the text may be inputted to the computer directly from a word processing program, such as Corel's WordPerfect®, or Microsoft Word® as a text file or by "copying" selected text from an open text file directly into the present software program.

According to the invention, upon receiving a captured video image of the user, the software program (see appendix for source code) first parses the text data into lines of text. The program determines which line or lines of text should be displayed on the screen and further determines the destination of each character within any line that is to be displayed on the screen, according to the fall rate assigned to each character. The program then compares the pixel color value of "destination pixels" (pixels located at the destination of each particular character) with a threshold color value. If the color value of the destination pixels is below the threshold value (i.e., lighter), then the particular character will be positioned at a destination according to its prescribed fall rate. If, however, the color value of the destination pixels exceeds the threshold value (i.e., darker), then it is determined that the virtual user's image is located at the destination of the particular character of the line of text. In such instance, the program locates a suitable new destination positioned vertically above the original destination which is lighter in color value than the threshold value.

Once all the characters of all the lines of text intended to be projected onto the screen are provided with suitable destinations, the program instructs the computer to display all of the characters on the screen at their respective destinations with the particular captured video frame. The process continues when a new image frame is available from the camera.

The program analyzes each captured image as it acquires at a prescribed sampling rate. The sampling rate is dependent on the speed of the video card components and drivers, the speed of the computer, and light sensitivity of the digital camera.

According to the invention, as the individual characters of a single line make their way down along the projection screen, the program keeps track of when a predetermined number of characters (e.g., at least half of them) travels a predetermined distance from the top of the viewing screen (such as the halfway point). If this is the case, the program causes the entire line of text to fade at a prescribed fade rate. When one line fades at the lower portion of the screen, another line appears at the top of the screen, with its characters beginning to fall. It is preferred that at least three lines of text be displayed on the screen at any given time.

Another aspect of the invention displays each line of text data as a separate color so that viewers may easily discern the letters or characters from different lines of inputted text, allowing the lines of text to be read relatively easily, as the letters fall towards and rest on various darker elements located within the virtual environment, such as the arm of a virtual user and perhaps a "virtual umbrella image" carried by the virtual user.

According to another aspect of the invention, each character of an inputted text string is horizontally held so that each character is restricted to vertically movement as it descends on the viewing screen at its prescribed fall rate or ascends upwardly with similar upward movement by the virtual user.

According to another embodiment of the invention, the program generates a shadow zone of dark pixels which are projected onto the viewing screen. The shadow zone is aligned with the optical input of the digital camera so that the camera will be protected from the relatively bright light of the projector. The computer generated shadow zone helps prevent the images recorded by the camera from becoming "washed out" by the light from the projector shining on the camera's lens.

BRIEF DESCRIPTION OF THE DRAWINGS

The foregoing discussion will be understood more readily from the following detailed description of the invention, when taken in conjunction with the accompanying drawings, in which:

FIG. 5 is a illustration of an exemplary data record which includes the text string of FIG. 4 and further includes text-controlling parameters, according to the invention;

DETAILED DESCRIPTION OF THE PREFERRED EMBODIMENTS

Figure 1:
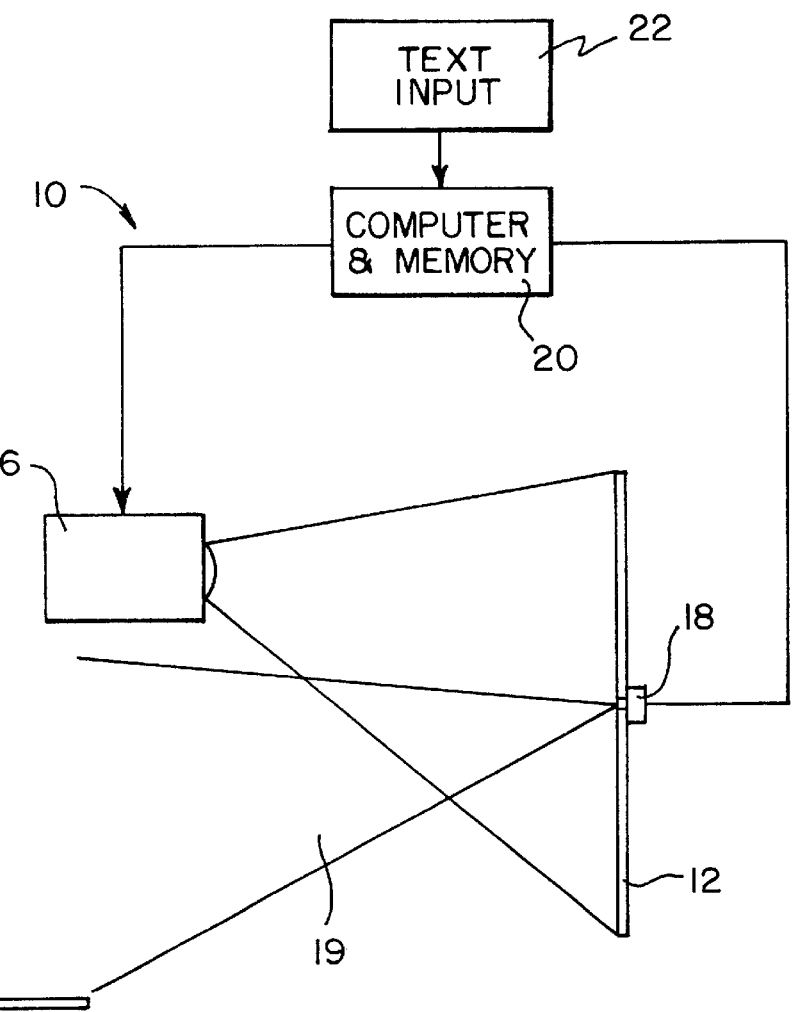
FIG. 1 is a schematic illustrating an interactive display system including a projection screen, a pickup camera, a projector, a computer, and a text input, according to the invention.
Figure 2:
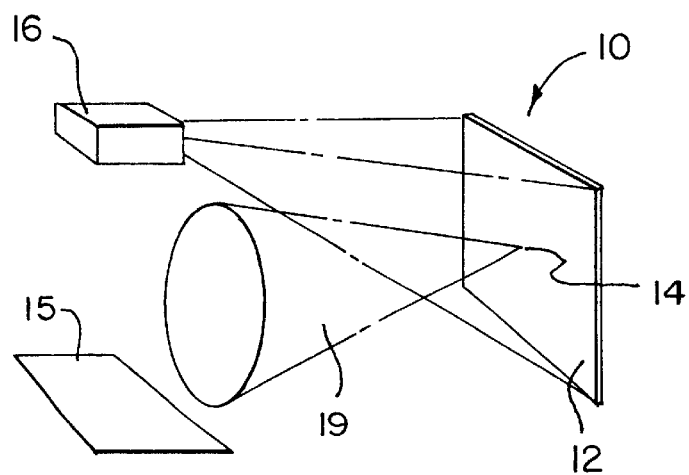
FIG. 2 is a perspective view of the interactive display system of FIG. 1, showing the field of view of the camera, according to the invention.
Figure 3:
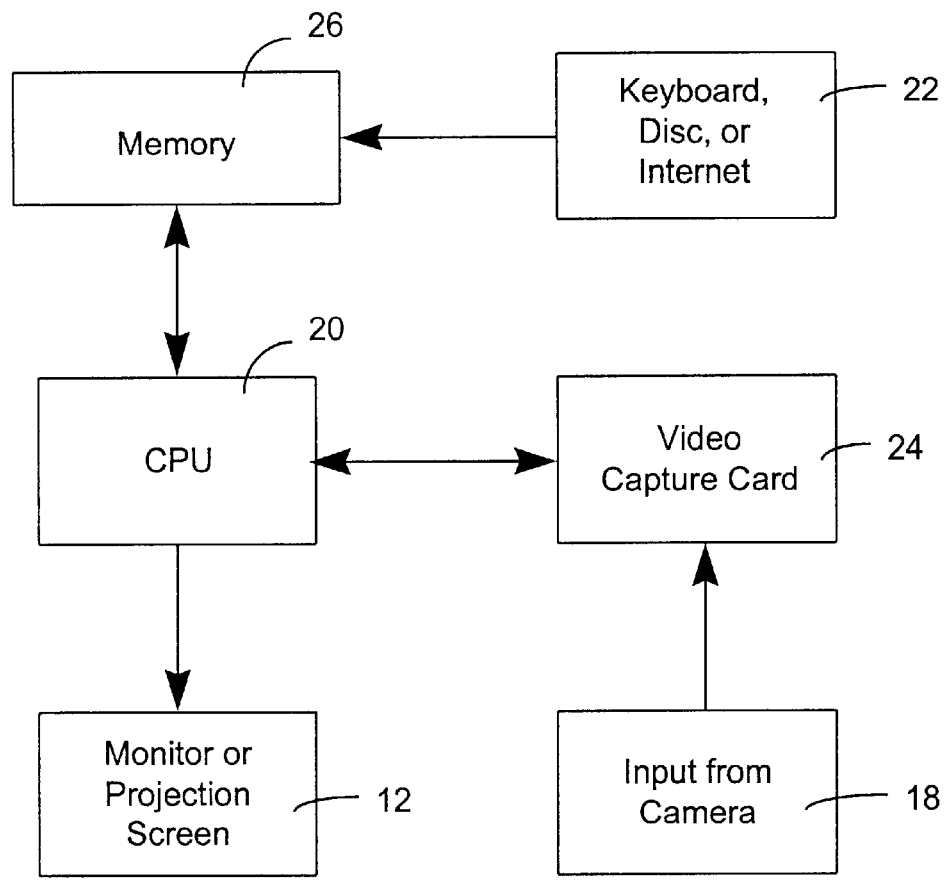
FIG. 3 is block diagram of the interactive display system, according to the invention.

Referring to FIGS. 1, 2, and 3 the interactive display system 10, according to the present invention, is shown including a large display screen 12 having a generally central and small opening 14, an image projector 16 positioned to project an image (along projection beam 17) onto the front surface of screen 12, and a camera 18, preferably a mini black and white CMOS-type video camera (alternately a Connectrix QuickCam® by Logitech® with appropriate platform drivers may be used). The camera 18 is positioned behind screen 12 with its image-receiving lens aligned with opening 14, so that a person (a user) standing in front of screen 12 (in the area represented by reference numeral 15, in FIGS. 1 and 2) and within the field of view 19 of the camera 18, is recorded by the camera. The camera 18 is preferably sufficiently light sensitive to "capture" repetitive images of the user in apparent realtime (i.e., generating a sufficient number of consecutive images so that when the sampled images are eventually projected, the motions of the user appear smooth and continuous). It is preferred, although not shown, that a rear surface or wall be located opposite the screen 12, behind the user, and that this rear surface be white and illuminated. Although the rear surface is not necessary for the present system to operate, it does allow the present program to quickly and easily distinguish the virtual user from the background.

The present interactive display system 10 further includes a computer 20 having a memory 21 and a text input 22, as shown in FIG. 1. Computer 20 may be conventional, and preferably includes a fast central processing unit (CPU), such as Intel's Pentium II® or higher. The video card of the computer preferably includes enough VRAM to display 640 X 480 resolution at high color (16 bit). If a CMOS type camera 18 is being used behind the large screen 12, then the computer 20 further requires a video capture card 24 to create a bitmap of the analog image of the CMOS camera 18. If a Connectix®-type camera is used (or equivalent), no capture card 24 is necessary because the Connectix®E-type camera uses software to digitize a recorded image. The computer 20 preferably uses Microsoft's Windows 98® or Microsoft's Windows NT® operating systems.

As is understood by those skilled in the art, the video capture card 24 is used to receive analog image data from the camera 18 and digitize the image by generating a bitmap (the present program can control the rate of sampling). During each sampling, as described below, the video card 24 captures a frame of image data from camera 18 as the camera records the user and digitizes the frame into array of picture elements, or "pixels," called a bitmap. Depending on the format, each pixel within a bitmap is identified by an RGB color code (a three number code which identifies the exact color of the pixel). The bitmap representing the received frame of analog image data is stored in memory for analysis and manipulation by the software program.

The computer receives a data record including text data and text-controlling parameters from text input 22. As described below the present software program manipulates both the digitized image of the received frame of analog image data and the text data from text input 22 and combines the video and text data onto the projection screen 12 in a generally smooth and continuous manner.

Text input 22 may include any of a variety of conventional input devices, such as a hard drive memory, disc memory, compact disc, or a conventional Internet connection (such as through a connected modem), or through the use of a connected keyboard. Alternately, the text may be supplied to the computer directly from a word processing program, such as Corel's WordPerfect®, or Microsoft Word® as a text file or by copying selected text from an open text file directly into the program. Text data is preferably inputted into the memory 21 of computer 20 for later retrieval by the present program and displayed in accordance with the invention, or alternately, the text is inputted in realtime for immediate projection onto screen 12.

Figure 4:
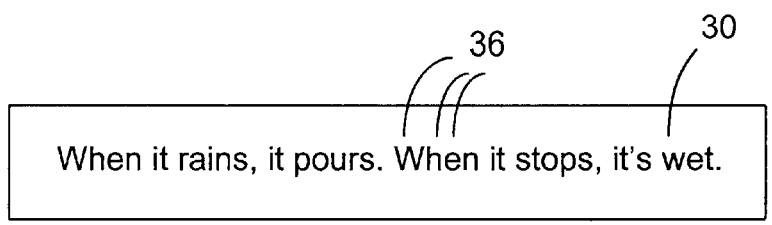
FIG. 4 is a illustration of an exemplary text string to be inputted into the interactive display system, according to the invention.

An example of text data 30 for use with the present invention is shown in FIG. 4 (shown displayed on a computer monitor 32): "When it rains, it pours. When it stops, its wet." This exemplary text data 30 is inputted into the computer 20 by any conventional means and is parsed into appropriately-sized lines 31 (depending on the size of the projection screen 12). If the text data 30 exceeds a certain number of characters 36, the program will parse the text data 30 into separate lines of text 31 so that each line may fit onto the screen 12 (the wider the screen 12, the longer each line of text 31). The program will form a line data record to keep track of which lines of text 31 are on the screen 12, are fading from the screen 12, and should be introduced at the top of the screen. Each line of text 31 located on the line data record will be introduced in a prearranged order and every line of text 31 which is being projected on the screen 12 will be electronically marked or flagged in the line data record. In this manner, as one line of text 31 fades from the screen 12, its electronic mark is removed from the line data record and a subsequent line of text 31 will be introduced onto the screen 12.

Each line located in the line data record, is also stored in a character data record 34, shown in FIG. 5. According to one aspect of the invention, the character data record 34 may further include various parameters which will control how each character 36 of each line of text 31 moves and appears within the virtual environment, as viewed on screen 12. The parameters may vary depending on the desired effect of the characters 36 of each line of text 31 within the virtual environment and depending on the complexity and speed of the interaction system.

The controlling parameters may include a fall rate value which controls the speed each character 36 of each line of text 31 appears to fall on the screen 12. The fall rate value may be defined in a variety of ways, such as the number of pixels traveled in one second or between captured frames of video.

Another character parameter may be a fall delay value which determines the length of time each character 36 will remain at the top of the screen 12 prior to falling.

A color code may be assigned to each character 36 or all of the characters within each line of text 31.

Another parameter for each character 36 is a horizontal hold condition which, when set, restricts each character to vertical movement when projected within the virtual environment.

A fade parameter controls whether a character 36 fades when reaching the bottom of the screen 12 within the virtual environment.

An edge-detect parameter determines whether a character will recognize the virtual image of a user within the virtual environment (i.e., determines if a virtual user interacts with the falling characters).

The distance the characters 36 "fall" along the screen 12 within the virtual environment may also be controlled using a maximum fall distance parameter.

The above-listed character parameters are provided to illustrate that each character 36 may be controlled in a variety of ways independently of the other characters 36 within a line of text 31. Although a variety of parameters are possible, as exemplified above, it is preferred that most, if not all, include default values which simplify the setup and use of the present program. It is preferred that an operator merely be required to input the text data 30 into computer 20 without further setup.

Figure 6A:
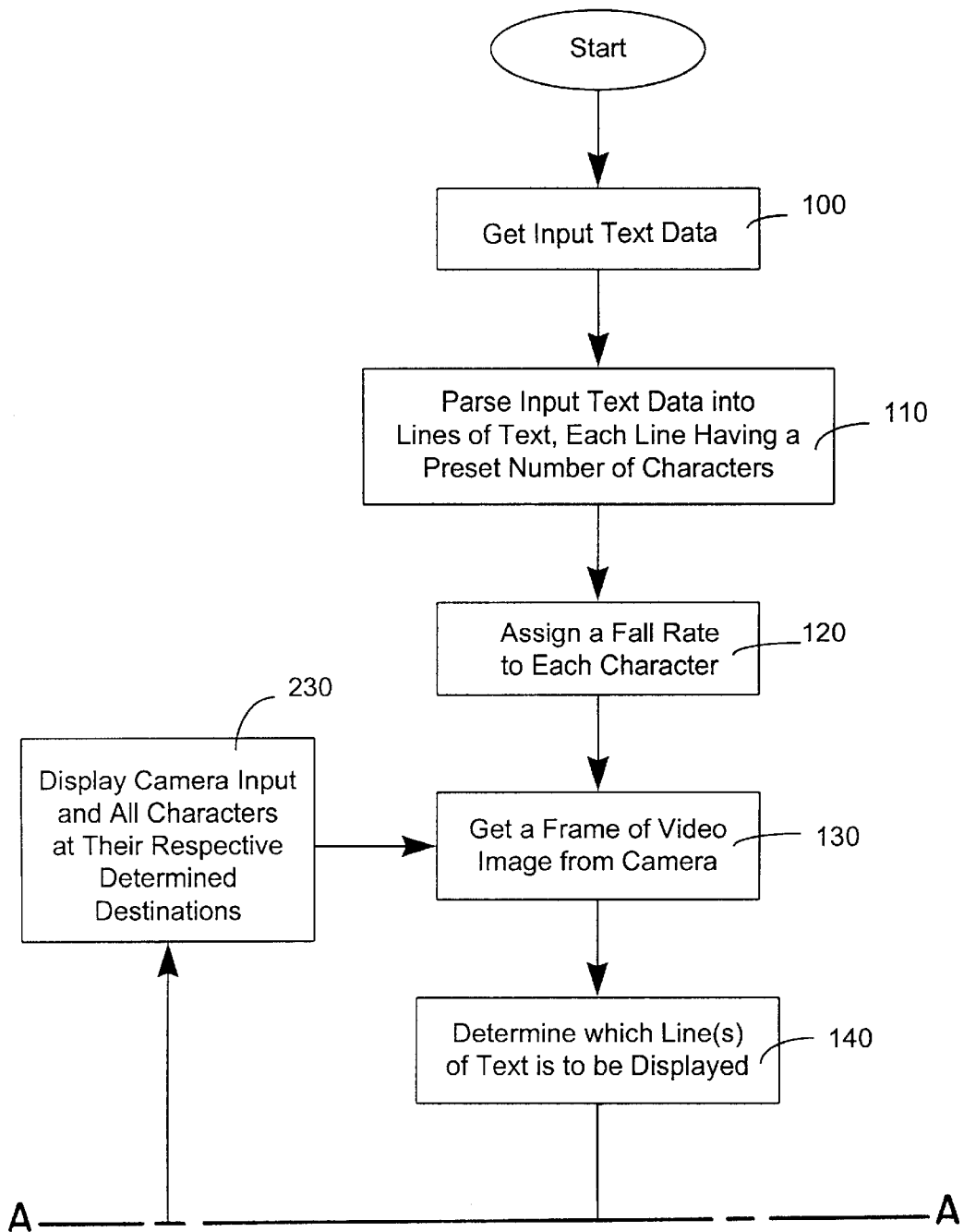
FIG. 6 is a flow diagram showing steps of obtaining and combining video and text data, according to the invention.

In operation, referring to FIG. 6, the present program first receives input text data 30 at step 100. The text data 30 is first divided up into lines of text 31 at step 110. The number of characters 36 in each line of text 31 depends, in part, on the dimensions of the viewing screen 12. The lines of text 31 may be divided into any number of characters, following, for example, the length of each line of a poem. A fall rate value (and perhaps other variables) is assigned to each character 36 of each line of text 31 at step 120. As described above, it is preferred that all the characters 36 of any given line of text 31 have the same fall rate. At step 130, a frame of video from the camera is received and digitized by the video capture card 24, generating a bitmap wherein an RGB color value is assigned to each pixel defined in the captured image frame. Once the program starts capturing frames of video data, the program enters into a callback mode whereby every time a new frame of video data is received, select pixels of the bitmap are analyzed, as described below. Since only select pixels are analyzed by the present program, the speed of the program is much faster than prior art VR systems which rely on analyzing each pixel in the bitmap for each frame of image data received.

At step 140, the program determines which lines of text 31 are to be displayed on the screen 12. It is preferred that three lines of text 31 be displayed on the screen 12 at any given time. The number of lines of text 31 may vary, of course, depending on the particular application, the size of the viewing screen 12, and the desired effect. At step 150, in FIG. 6, the program determines the destination for a selected character 36 among the characters of the "to be displayed" lines of text 31, according to the predetermined fall rate of the selected character 36. At step 160, the color value of the "destination pixels" or those pixels which are located at the destination of the selected character 36 at step 150. The program, at step 170, then compares the read color value of the destination pixels with a threshold color (or contrast) value. At step 180, if it is determined at the comparison step 80 that the destination pixel color value is greater than the threshold color value, then the destination of the selected character 36 is raised by a predetermined number of pixels, preferably a single pixel, at step 190. In this instance, the pixel color value at the newly determined destination of the selected character 36 is again read at step 160, its value compared again with the threshold value at step 170 and a decision is again made at step 180 until the read pixel value of the destination pixel is less than or equal to the threshold color value.

At this point, the determined destination of the selected character 36 is stored in memory at step 200. At step 210, it is determined if any more characters 36 remain within the "to be displayed" lines of text 31. If there are more characters 36 remaining within the "to be displayed" lines of text 31, another character 36 is selected at step 220 and again the destination of the newly selected character 36 is determined at step 150 and the above-described process is repeated until the destination of each character 36 of the "to be displayed" lines of text 31 have been determined. When this occurs, the captured video image frame together with each character 36 of the "to be displayed" lines of text 31 are displayed onto screen 12 (at step 230), with each character 36 located at each respective destination, as determined by the program and as stored at step 200.

The program then returns to step 130 to acquire another image frame of video from camera 18 and repeats the above described steps, as shown in the flow diagram of FIG. 6.

Figure 7:
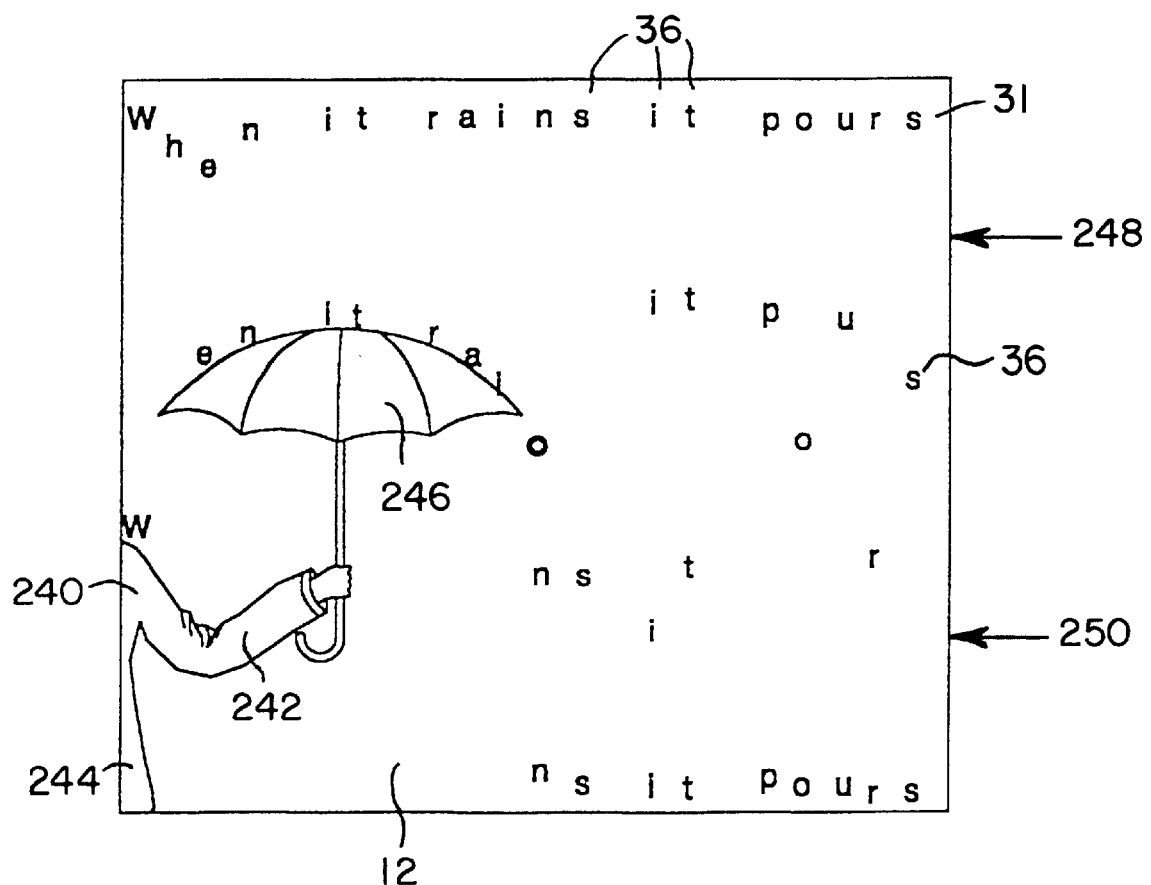
FIG. 7 is a front view of the viewing screen, illustrating an exemplary displayed virtual image including a virtual user holding a virtual umbrella, and further including falling text, according to the invention.
Figure 8:
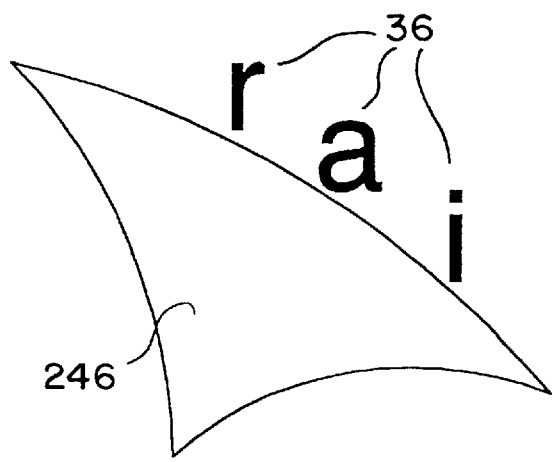
FIG. 8 is an enlarged view of a portion of the virtual umbrella of FIG. 7 and select letters of the text, according to the invention.

The end result is that the individual characters 36 of their respective "to be displayed" lines of text 31 will appear to fall (at their prescribed fall rate) from the top of the projection screen 12, as illustrated in FIGS. 7 and 8. In FIG. 7, an exemplary projected image on screen 12 is shown to have a shoulder 240, and an arm 242 of a virtual user 244. The actual user (not shown) and the virtual user 244 are holding an umbrella 246 which appears on the screen 12 in this example, as a virtual umbrella 246. As is shown, the program has displayed the video image of the virtual user (shown in part) 244 holding the virtual umbrella 246 and the inputted lines of text 31: "When it rains, it pours". In this exemplary scene, a new line of text 31: "When it rains, it pours" has just been introduced at the top portion of the screen 12, generally indicated by arrow 248 of FIG. 7. The characters "h" and "e" of the word "When" have already started to fall at their quicker fall rates. Various characters 36 from previously introduced lines of text 31 (in this example, all the lines of text 31 shown on the screen 12 are the same: "When it rains, it pours") have been drifting downwardly from the top portion 248 of the screen 12 to towards the bottom portion of the screen, generally indicated by arrow 250 in FIG. 7.

Following the steps described above, as the computer 20 determines the destination of each character 36, it quickly reads the pixel color values at that destination of the captured image and determines whether a virtual obstacle is already located there. If no obstacle is there (i.e., the read pixels are less than or equal to a threshold value), then the particular character 36 appears on the screen 12 at the destination and, as subsequent images are displayed on screen 12, the particular character 36 will appear to slowly fall, like snow. If however, a virtual obstacle is determined to be located at the destination of a particular character 36, then a new destination located higher on the screen 12 is selected so that the character 36 appears to interact with the virtual obstacle located in the virtual environment. This interaction is illustrated in FIG. 8, wherein an enlarged partial section of the umbrella 246 is shown "capturing" the characters "r", "a", and "i" of the word "rains". These characters 36 will remain at the first "light" pixel (below the pixel color threshold value) located above the relatively dark pixels which make up the umbrella 246 so that the characters 36 appear to have fallen onto and are supported by the umbrella 246. If the user raises the umbrella 246, the program will quickly detect this upward movement because the "lighter" pixel between the character 36 and the umbrella 246 will become a dark value causing the computer to respond by raising the affected characters 36 upwardly with the umbrella movement, so that the characters 36 appear to have been lifted by the umbrella 246. The characters 36 can move upwardly very quickly, but will preferably always fall at the predetermined fall rate, as discussed above.

As subsequent video images are sampled, each character 36 of a line of text 31 appear to gradually descend on the screen 12 until the character 36 confronts a dark pixel, signifying a virtual obstacle within the virtual environment. Although the present program may be setup so that the characters 36 fall at any fall rate, it is preferred that the characters 36 fall in a manner which is somewhat familiar and pleasing to the user, similar, for example, to the graceful movements of an airborne leaf slowing falling from a tree. A user can "catch" the falling leaf and quickly push it back into the wind currents, but the leaf will always fall back down at its leisurely pace. By "training" the introduced characters 36 to respond in this manner within the virtual environment, the user is likely to remain comfortable and will be encouraged to further interact and explore within the virtual environment.

The text data 30 may be the lines of a poem, song, or even the tag-line of an advertisement of a particular product and may be projected in any size, shape or font (system fonts are preferably used so that the processing is faster). As the user interacts with the introduced lines of text 31, he or she must physically manipulate the falling characters 36 and perhaps capture several of them to read them and understand the actual text, but the fun of combining such a physical activity with reading only encourages the user to succeed in reading the textual information. Whatever message the textual information is to convey is more likely to reach the viewer or user when the user gets to participate with the message in an interactive game-like environment.

The textual information introduced into the present program may be continuously changed, such as in the case of weather reports, or news stories. Alternately, the textual information may be altered in realtime, perhaps in response to the particular actions of the user. In this instance, a user may be asked questions in a text format with the question appearing on the screen 12 together with the image of the user. When the user reads the question on the screen 12, perhaps after capturing the characters 36, he or she can audibly answer the question. The response to the question can be heard by the operator of the system. who may then ask another question (again in text format) which relates or corresponds to the user's response to the previous question. This type of interaction between the text-input operator and the user may further entertain and teach the user and any viewer of the system.

According to another aspect of the invention, text data may be introduced one line at a time allowing a first line of text 31 to be introduced at the top of the of the viewing screen 12 so that each character 36 begins to fall (as viewed on the viewing screen 12), either at similar fall rates or at different ones. When a predetermined number of falling characters 36 (e.g., at least half of them) travels a predetermined distance from the top of the viewing screen 12, a second line (or select characters of the second line) of text 31 will appear at the top of the screen 12. The characters 36 of the newly introduced second line of text 31 will begin to fall along the viewing screen 12 in a similar manner to those of the first line of text. Third and other lines of text 31 may be displayed in a similar and repeating manner.

Another aspect of the invention causes inputted lines of text 31 to fade (at a prescribed fade rate) when a predetermined number of characters (e.g., at least half of them) reach a predetermined position on the viewing screen (e.g., enter the lower half of the screen). In a preferred embodiment, at any given moment, three lines of text 31 are displayed on the viewing screen 12, one line of text 31 being introduced at the top of the screen, a second one falling in the middle of the screen (an "interactive region"), and a third line of text 31 fading out at the lower portion of the screen. Of course, some of the characters 36 (or letters) of earlier introduced lines of text 31 may remain on the screen, "captured" by virtual obstacles, such as the above-described umbrella 246 of FIG. 7. If one particular character 36 from a first line of text 31 remains held in vertical space by a virtual obstacle (e.g., umbrella 246), the same character 36 from subsequent lines of text 31 will eventually overlay the first "held" character 36 so that similar characters 36 held by virtual obstacles will not accumulate in number over time. However, it is also contemplated that as characters 36 descend onto each other on the screen 12, the program can be altered so that any higher character 36 will consider a lower "held" character to be part of the virtual obstacle so that the characters will pile up (stack on top of each other), until the obstacle is cleared (i.e., the user moves).

According to another aspect of the invention, each line of text 31 is displayed as a separate color. In this arrangement, viewers may easily discern the characters from different lines of text 31 so that the lines of text 31 to be read relatively easily even as the individual characters 36 fall towards and rest on various darker elements located within the virtual environment, such as the arm of a virtual user and perhaps a "virtual umbrella image" carried by the virtual user.

According to another aspect of the invention each character 36 of inputted text data 30 is horizontally-held, so that each character 36 is restricted to vertically movement as it descends on the viewing screen 12 at its prescribed fall rate, or ascends with upward movement of a virtual obstacle.

The techniques described herein for integrating a user's image and inputted textual data within a digitally represented environment can be applied to numerous applications including fun and educational communication applications for use in schools to help kids learn to read or just have fun. In this application, Kids could be asked, for example, to interact with a falling sentence by "capturing" a verb located within the falling sentence.

The present system can also be installed at a store front, in which case a display monitor may be positioned within the store so that it may be viewed by passing pedestrians. In this application, the appearance of a pedestrian on the monitor will invariably attract the attention of the pedestrian, who will stop and interact with the textual message falling all around his or her image being displayed on the screen. The message, in this example, would help lure customers inside the store to purchase products.

Other useful applications for this technology include performance art, either used in connection with an artist or an audience member. The present invention can be setup within an art gallery, exhibit, or museum as an interesting and alluring way to convey any textual information either as a piece of art work, or as a source of information, such as an interactive information kiosk.

According to another aspect of the invention, the present software is connected to the Internet through appropriate modems, T1, or DSL communication lines for the purpose of allowing Internet users to introduce text data 30 to a particular interactive display shown over the Internet. Also, the software program may be used with a local PC whereby the computer's monitor becomes the viewing screen, and a local "webcam" type camera (or any other appropriate camera) may be used to record the user, who in this case, would be positioned in front of the computer. If a CRT or LCD type monitor is used as the screen 12, the camera may be positioned on top of (or adjacent to) the monitor.

Figure 9:
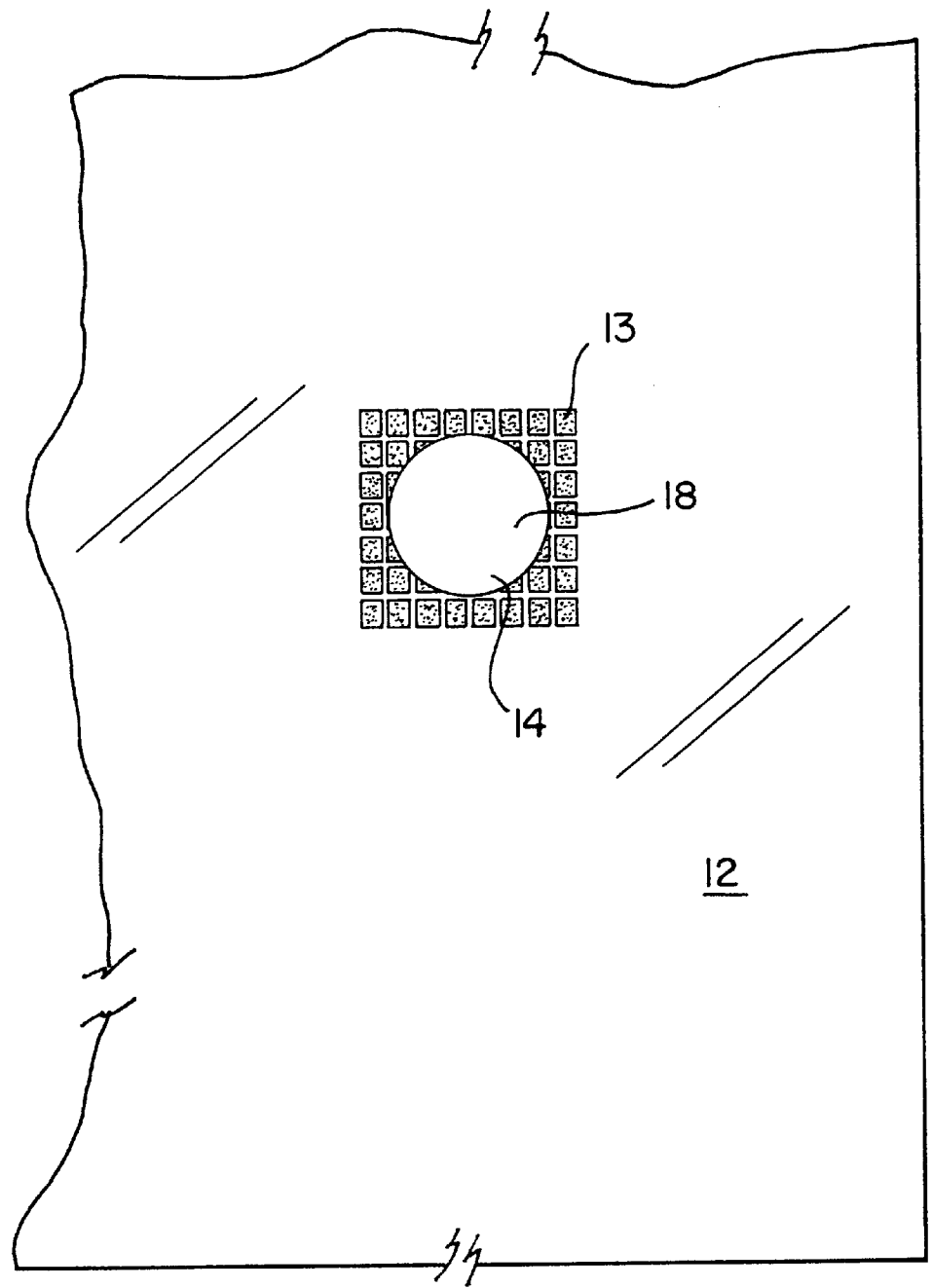
FIG. 9 is a enlarged partial front view of the viewing screen showing details of a central opening and a computer generated shadow zone, according to the invention.

Referring to FIG. 9, an enlarged partial screen 12 showing the central opening 14 is shown, according to another embodiment of the invention. Applicant has discovered that light from projector 16 directed to the optical input lens of camera 18 causes the images captured by the camera to appear "washed out" because the camera automatically compensates for correct exposure. To overcome this problem, the present program generates a shadow zone 13 of dark pixels which are projected onto the viewing screen 12. The shadow zone 13 is aligned with the optical input of the digital camera so that the camera will be protected from the relatively bright light of the projector. The computer-generated shadow zone 13 helps prevent the images recorded by the camera from becoming "washed out" by the light from the projector shining on the camera's lens. The shadow zone 13 is shown as a darkened square, however, the shadow zone 13 may take on any useful shape to cover opening 14, and also may be any shade of gray. The program includes means to project the shadow zone 13 when each image and lines of text 31 are projected onto screen 12. Also, the projected position of the shadow zone 13 on screen 12 may be easily moved by the program, using an appropriate input device, such as a mouse or a keyboard (not shown).

The present software program (see appendix for actual source code) is written in C++ programming language using standard Microsoft® and Video-for-Windows® Libraries.

Although the above detailed description of the invention assumes the presence of a single user, the invention is capable of simultaneously supporting multiple users. These users can occupy the same space in front of a single camera 18, or images of each user can be inputted to a single computer 20 using separate cameras at physically disparate locations. In the latter case, remote image data reaches the invention by means of suitable network connections, and the invention sends picture signals to the user's remote monitor over the same facility. In this way, all users interact in the same virtual world.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method for facilitating real-time interaction between a user and a digitally represented visual environment within which the user's moving image is integrated, said method including the use of a computer, electronic memory, a display, a video camera, and a video input device, the method comprising the steps of:

storing a first computer generated digital image in said electronic memory;

assigning a velocity of movement to said digital image, said velocity of movement including a rate of movement and a direction of movement of said digital image;

recording the image of said user using said video camera;

simultaneously displaying the image of said user and said stored first digital image onto said display, at a predetermined refresh rate;

digitally repositioning said displayed first digital image on said display according to said assigned velocity of movement;

comparing the relative position of said displayed image of said user and said displayed first digital image;

determining when said displayed first digital image and the displayed image of said user are within a predetermined distance on said display;

changing said velocity of movement of said displayed first digital image in response to determining that said displayed first digital image and the displayed image of said user are within said predetermined distance; and simultaneously displaying said first digital image at said new velocity of movement, and the image of said user.

2. A method for facilitating real-time interaction between a user and digitally represented text data on a display within which the user image is integrated, the method comprising the steps of:

storing text data in said electronic memory;

assigning a velocity of movement to said text data, said velocity of movement including a rate of movement and a direction of movement of said text data;

recording the image of said user using a video camera;

simultaneously displaying the image of said user and said stored text data onto said display, at a predetermined refresh rate;

digitally repositioning said displayed text data on said display by said assigned velocity of movement;

comparing the relative position of said displayed image of said user and said displayed text data;

determining when said displayed text data and the displayed image of said user are within a predetermined distance on said display;

changing the velocity of movement of said displayed text data in response to determining that said displayed text data and the displayed image of said user are within said predetermined distance; and simultaneously displaying said text data at said new velocity of movement and the image of said user.

3. The method of claim 2, wherein said display includes an upper edge and a lower edge, and said velocity of movement of said text data includes a direction towards said lower edge of the display.

4. The method of claim 2, wherein said velocity of movement of said text data includes a first rate of movement, and said new velocity of movement of said text data includes a second rate of movement.

5. The method of claim 2, wherein said new velocity of movement of said text data includes no movement.

6. The method of claim 2, wherein said assigned velocity of movement of said text data includes a first direction of movement, and said new velocity of movement of said text data includes a second direction of movement, said second direction of movement being opposite said first direction of movement.

7. The method of claim 2, wherein said text data is initially displayed on said display at a predetermined location prior to moving at said assigned velocity.

8. The method of claim 2, wherein prior to performing the step of storing text data into electronic memory, a step of receiving text data from a keyboard is performed.

9. A method for facilitating real-time interaction between a user and digitally represented text data on a display within which the user image is integrated, the method comprising the steps of:

storing text data in an electronic memory;

assigning a velocity of movement to said text data, said velocity of movement including a rate of movement and a direction of movement of said text data;

storing a threshold pixel color value in electronic memory;

recording the image of said user using a video camera;

simultaneously displaying the image of said user and said stored text data onto said display, at a predetermined refresh rate, thereby creating a combined image;

determining a destination of said text data, according to the assigned velocity, said text data destination being the point within the combination image where the text will next be displayed;

measuring the pixel color value of the displayed image at the determined text data destination;

comparing the measured pixel color value at the text data destination with said stored threshold color value;

displaying said text data at said text data destination in response to said comparing step determining that said measured pixel color value at the text data destination is less than said stored threshold color value; and displaying said text data at a position within said combined image on said display other than said text data destination in response to determining in said comparing step that said measured pixel color value at the text data destination is greater than the stored threshold color value.

10. The method of claim 9, further comprising the step of changing the velocity of the text data in response to said comparing step determining that said measured pixel color value at the text data destination is greater than the stored threshold color value.

* * * * *